United States Patent [19]
Ichinose

[11] Patent Number: 5,969,831
[45] Date of Patent: Oct. 19, 1999

[54] IMAGE READING SYSTEM HAVING AUTOMATIC DOCUMENT FEEDING DEVICE

[75] Inventor: Hayato Ichinose, Yamanashi-ken, Japan

[73] Assignee: Nisca Corporation, Yamanashi-ken, Japan

[21] Appl. No.: 08/926,843

[22] Filed: Sep. 10, 1997

[30] Foreign Application Priority Data

Sep. 11, 1996 [JP] Japan ................................. 8-263628

[51] Int. Cl.[6] .................................................. H04N 1/04
[52] U.S. Cl. ........................... 358/498; 358/496; 382/312
[58] Field of Search .................................. 358/498, 496, 358/474, 400; 382/312; 271/109, 4.1, 10.11, 121, 3.2, 3.14; 399/110; H04N 1/04

[56] References Cited

U.S. PATENT DOCUMENTS

| | | | |
|---|---|---|---|
| 5,552,902 | 9/1996 | Kohno ...................................... | 358/498 |
| 5,606,430 | 2/1997 | Marikawa et al. ....................... | 358/498 |
| 5,661,572 | 8/1997 | Kameyama et al. ..................... | 358/498 |
| 5,739,925 | 4/1998 | Kameyama et al. ..................... | 358/498 |
| 5,768,448 | 6/1998 | Ichinose .................................. | 382/312 |

*Primary Examiner*—Edward L. Coles
*Assistant Examiner*—Cheukfan Lee
*Attorney, Agent, or Firm*—Kane, Dalsimer, Sullivan and Levy, LLP

[57] ABSTRACT

An automatic document feeding device detachably attached to a document reading device has a document stacker into which one or more documents to be read are set while depressing a handling part to push down the documents on the stacker, so that the documents thrust into the stacker can be accurately positioned at a document delivery standard point without getting over the delivery standard point. Motive power for driving the document feeding device can be given from a driving mechanism in the document reading device through a power transmission means, so as to rationally drive the document feeding device in concert with the document reading device, thereby to reliably send out the documents one by one from the document stacker to a document reading position defined in the document reading device through a document passage for accomplishing the desired image reading.

8 Claims, 9 Drawing Sheets

IMAGE READING SYSTEM HAVING AUTOMATIC DOCUMENT FEEDING DEVICE

BACKGROUND OF THE INVENTION

1. Field of the Invention

This invention relates to an image reading system having a document feeding device for automatically feeding one or more documents to an image reading position, and more particularly to the document feeding device of the image reading system, which enables card-like documents such as a name card to be accurately set at a delivery standard point and securely forwarded to the image reading position.

2. Description of the Prior Art

An optical image reading device such as an image scanner and card reader, which has been used for reading characters, images or the like printed on a document in the form of electronic information data, are often provided with a document feeder for automatically feeding the document to the document reading device.

Japanese Patent Application Public Disclosure HEI 3-235470(A) and Japanese Utility Model Application Public Disclosure HEI 1-108659(A) each disclose an image reading device for reading an image on a document such as a name card and an envelope. In this image reading device, the image on the document is read when the document being forwarded along a document setting face of the device toward an image reading position by driving document feeding rollers passes through the image reading position.

Although a copying machine or facsimile which is a kind of image reading device may be provided with an ordinary automatic document feeder, the document feeder applied to an image scanner or a card reader necessitates high performance to reliably forward the documents one by one to the image reading position. Besides, the document to be fed to the image scanner or card reader must be set on the document feeder so as to accurately place the leading end of the document in position at the delivery standard point determined on the document feeder. Inaccuracy in positioning the document will entail decrease in accuracy of optical character recognition (OCR) or other image reading performance.

It is convenient to use a demountable document feeder capable of being easily attached to or detached from a stand-alone type card reader to which documents to be subjected to image reading must be inserted one by one. The demountable document feeder which is united with the card reader is further required to acquire motive power from the card reader to feed the document to the card reader, and be controlled on the side of the card reader, so that the entire system including the document feeder can be managed collectively in cooperation with the card reader.

OBJECT OF THE INVENTION

An object of the present invention is to provide an image reading system having an automatic document feeding device capable of being easily attached to and detached from a stand-alone type document reading device to which a document can be fed manually, so that documents to be read can be automatically fed reliably one by one to a document reading position defined in the document reading device.

Another object of the invention is to provide an image reading system having an automatic document feeding device for allowing the documents to be accurately placed at a delivery standard point defined on the system, thereby to improve the performance of reading characters or images and heighten the optical character recognition rate.

Still another object of the invention is to provide an image reading system incorporating a document reading device and a demountable automatic document feeding device capable of being rationally operated by making use of means for driving the document reading device.

SUMMARY OF THE INVENTION

To attain the objects described above according to the present invention, there is provided an image reading system comprising image reading means for reading an image on a document passing through a document reading position, means for conveying the document, and a document feeding device including a document stacker for stacking one or more documents to be read, a kick roller for sending out the document from the document stacker, a separation means is for permitting one document sent out from the document stacker by the kick roller to pass therethrough, and a document restraining member movable between a lower check position at which the document stacked in the stacker is prevented from entering the separation means and an upper retreat position.

The stacker is provided with a movable document bed for supporting one or more documents, which is urged upward to bring the documents placed thereon into press contact with the kick roller.

The document feeding device is further provided with handling means which can be manually depressed to press down a sheaf of documents placed on the movable document bed. By depressing the handling means when the documents are set on the movable document bed, the documents are separated from the kick roller so as to prevent the leading edge of the sheaf of documents from colliding with the kick roller and the documents from getting over the document restraining member, consequently to allow the leading edges of the documents to be trued up at the appropriate delivery standard point determined in the document feeding device. As a result, since the documents set on the movable document bed can be reliably sent out one by one with a high accuracy of delivery by rotating the kick roller, the accuracy of scanning can be improved so as to accurately read the image on the document at the image reading position.

The document feeding device is detachably attached to the document reading device. When the document feeding device is united with the document reading device, it can be connected to a driving mechanism incorporated in the document reading device to acquire motive power from the document reading device, thus to rotate the kick roller in concert with the document conveying means of the document reading device. In consequence, the system can be rationally operated and achieve accuracy in forwarding the document.

Other objects and features of the present invention will be hereinafter explained in detail with reference to the accompanying drawings.

DESCRIPTION OF THE PREFERRED EMBODIMENTS

This invention is concerned particularly with a document feeding device capable of being detachably attached to a document reading device with ease in an image reading system. The document feeding device permits documents to be securely placed at an appropriate document delivery standard point so that an image on the document can be optically scanned to be read with a high accuracy. The document reading device in the illustrated embodiment assumes the structure of a card reader or an image scanner by way of explanation, but the invention does not contemplate imposing any limitation on the structure of the document reading device to be specified.

Figure 1:
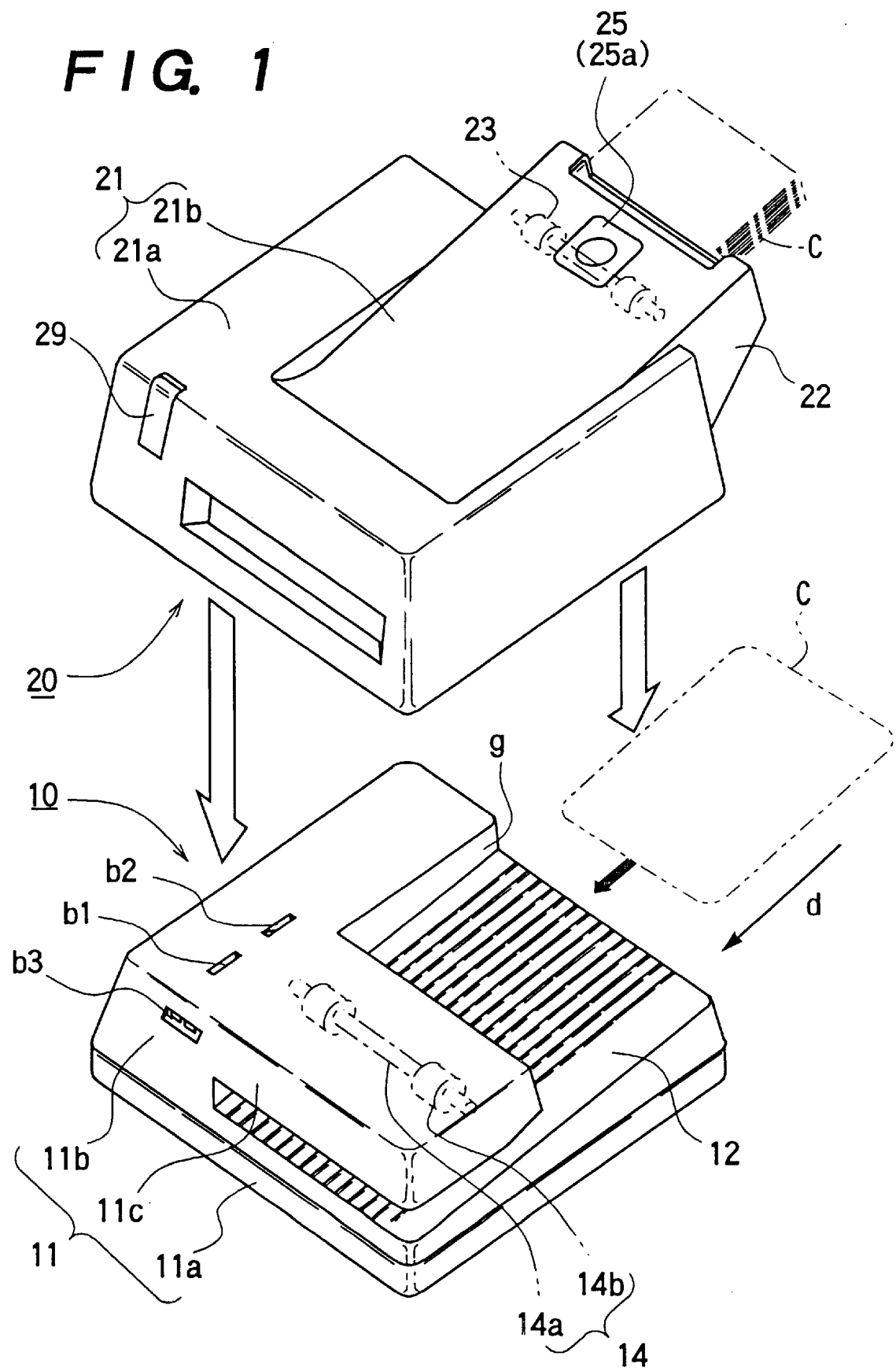
FIG. 1 is a perspective view schematically showing one embodiment of an image reading system according to this invention in the state of separating a document feeding device from a document reading device.

As conceptually illustrated in FIG. 1, the image reading system of the invention comprises a document reading device 10 for optically scanning a given document to read an image on the document, and a document feeding device 20 for automatically feeding documents one by one to the document reading device 10. Although the document feeding device 20 is usually united with the document reading device 10 in use, it is separable from the document reading device 10 as shown in FIG. 1. Hence, so far as the document reading device 10 is provided with means for uniting with the document feeding device 20, the document reading device may be of any type such as an image scanner, copying machine and facsimile.

The document reading device 10 in the illustrated embodiment comprises a casing 11 having a base frame 11a, a driving part 11b, and an upper frame 11c opposed to the base frame 11a astride a document passage P; a document setting face 12 formed on the base frame 11a to place thereon the one or more documents C such as a name card or an envelope and slanted toward a document forwarding direction (sub-scanning direction) d; image reading means 13 contiguous with the document setting face 12 on the downstream side relative to the document forwarding direction d; document conveying means 14 disposed in the upper frame 11c and facing the image reading means 13; a mechanism 15 for driving the document conveying means 14; and document detecting means 16.

The upper frame 11c is supported at its one end like a cantilever by the driving part 11b so as to generally form the casing 11 in the shape of a substantial square bracket ([) as viewed from front. The driving part 11b has a rising wall perpendicular to the document setting face 12, which serves as a guide surface g for guiding one side of the document being forwarded along the document setting face. Thus, the document passage P being open on its one side as viewed from front is defined by the base frame 11a, the guide surface g of the driving part 11b, and the upper frame 11c. Since the document passage P is open on the side opposite to the guide surface g, the document of any size can be set on the document setting face 12 even if the document to be dealt with is larger than the document setting face 12. However, the document passage P is not necessarily open on its one side and may be formed like a tunnel.

The image reading means 13 comprises a transparent platen 13a flush with the document setting face 12, which is located at the document reading position Rx, a holder 13b for holding a platen 13a, a spring 13c for resiliently urging the holder 13b upward, a light source 13d for illuminating the image surface of the document passing along the upper surface of the platen 13a, a reflector 13e for refracting image light reflected from the image surface of the document, and a photoelectric conversion means 13f for converting the image light reflected from the document through the reflector 13e into corresponding electric signals.

The image reading means 13 generally has a function of reading the optical density of a given image on the document placed on a platen 13a and outputting the corresponding electric signals by use of the photoelectric conversion means 13f, so as to recognize the given image or reproduce the image, but the structure and components of the image reading means are not specifically limited, and any techniques which are conventionally known for optically reading the given image may be used for this invention.

The document conveying means 14 comprises a rotation shaft 14a disposed in the upper frame 11c in parallel with the platen 13a, and at least one conveying roller 14b held by the rotation shaft 14a and being in press contact with the platen 13a.

The mechanism 15 for driving the document conveying means 14 comprises a power source 15a such as a motor, and a transmission means 15b for transmitting motive power from the power source 15a to the rotation shaft 14a of the document conveying means. The illustrated embodiment makes use of gears as the transmission means 15b, but timing belts or other transmitting means may be used instead.

The document detecting means 16 comprises a detection lever 16a which is swingingly moved by the document being forwarded along the document setting face 12, and a sensor 16b which is actuated by the swinging movement of the detection lever 16a. Therefore, when the sensor 16b is actuated by the lever 16a, it can be recognized that the document is being forwarded to the document reading position. In the state of separating the document feeding device 20 from the document reading device, the power source 15a is operated in response to the document detected by the sensor 16b, so that the conveying roller 14b is rotated by the motive power given through the power transmission means 15b and rotation shaft 14a, thereby to forward the document set on the document setting face 12 in the forwarding direction d.

To be more specific, when the document to be subjected to image reading is place on the document setting face 12 and sent toward the document reading position Rx along the document setting face 12, the detection lever 16a acts on the sensor 16b. Thus, when the document arriving at the document reading position is recognized by the action of the detection lever 16a, the conveying roller 14b starts to rotate, consequently to forward the document. The image on the document is scanned and read by the image reading means 13 as the document passes through the document reading position Rx.

The document conveying means 14 has an active member 17 rotatably supported by the rotation shaft 14a. The active member 17 confronts a through hole b1 bored in a part of the casing 11, i.e. the upper panel of the driving part 11b. The free end of the active member which confronts the through hole b1 comes down in response to downward movement of an actuating lever 24, which is caused by setting one or more documents on the document feeding device 20, consequently to rotate the active member 17. The rotation of the active member 17 is optically detected by the photoelectric conversion means 13f through the medium of the reflector 13e. That is, as the change in posture of the active member 17 varies the intensity of light arriving at the means 13f, it can be recognized that the documents are set on the device 20.

The document feeding device 20 has a lid frame 21 formed of a stationary part 21a covering the casing 11 of the document reading device 10, and a document introducing part 21b. Reference numeral 21c denotes a partition member opposite to the upper surface of the document reading device 10.

In addition to the actuating lever 24 for allowing the document feeding device to work in cooperation with the document reading device 10, the document introducing part 21b includes a document stacker 22 for storing one or more documents to be subjected to image processing, a kick roller 23 for sending out the documents one by one from the document stacker 22, and a handling means 25 for operating the actuating lever 24.

The document stacker 22 has a vertically movable document bed 22a for placing one or more documents thereon, a spring 22b for resiliently urging upward the document bed 22a to bring the document set on the document bed into press contact with the aforementioned kick roller 23, a document holding member 22c defining a document delivery standard point Sx. The document to be subjected to image reading is set on the document bed 22a in such a state that the leading end of the document on standby on the document bed 22a is retained at the document delivery standard point Sx.

The actuating lever 24 which cooperates with the document reading device 10 in accordance with the movement of the documents set on the document stacker 22 is provided at one end thereof with an inclined document restraining member 24a facing the document stacker 22, and at the other end with a working member 24b facing the image reading means 13. The actuating lever 24 is rotatably held by the shaft 24c fixed on the lid frame 21, and urged in the clockwise direction in FIG. 3 by a spring 24d so as to depress the document restraining member 24a.

The handling means 25 has a function of acting the actuating lever 24 to prevent the documents from getting over the document holding member 22c when setting the documents onto the document stacker. That is, by depressing the handling means 25 with a finger while placing the documents onto the stacker, the document restraining member 24a of the actuating lever 24 assumes its lower check position to lower the document bed 22a, and then, the documents are thrust into between the document restraining member and the document bed. Upon setting the documents on the document bed, the depressing force exerted on the handling means 25 with the finger is released to move upward the documents by the document bed resiliently urged upward, consequently to bring the uppermost one of the documents placed on the document bed 22a into press contact with the kick roller 23. Consequently, since the lower end of the document restraining member 24a is positioned at the level lower than the upper end of the document holding member 22c when depressing the handling means 25 with the finger, the documents when being set onto the document stacker are urged downward by the document restraining member pressed downward by the handling means 25, so that it is prevented from getting over the document holding member 22c.

Figure 6:
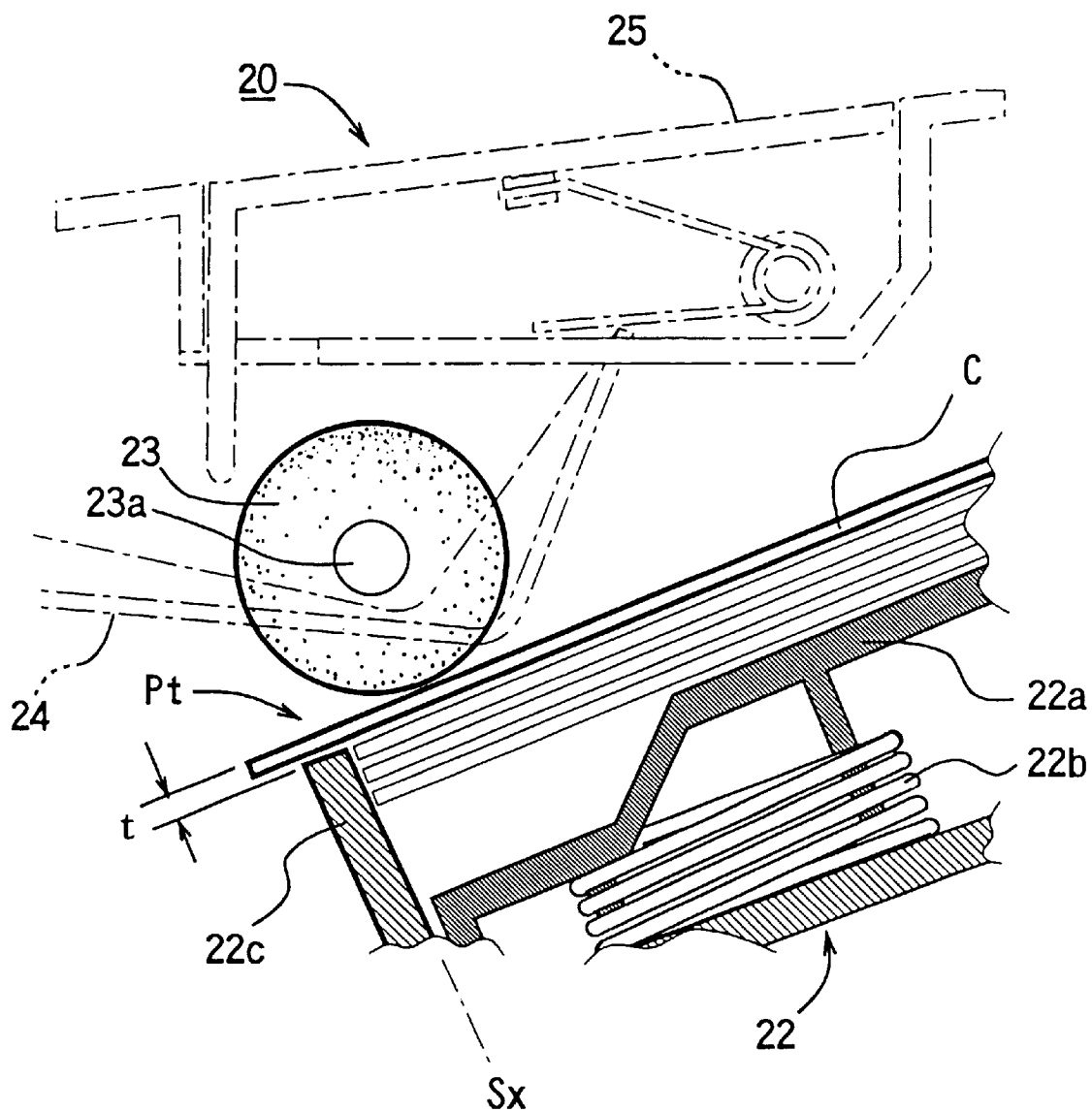
FIG. 6 is an enlarged side sectional view schematically showing in part the document feeding device.

By rotating the kick roller 23 coming in contact with the uppermost of the documents set on the document stacker 22, the uppermost document is sent out from the document stacker 22. As illustrated in FIG. 6, the distance t between the upper end of the document holding member 22c and the tangential line of the kick roller 23 relative to the direction perpendicular to the upper surface of the document bed 22a may preferably be determined to be slightly larger than the thickness of a relatively thick paper sheet such as a name card, so that only one document is permitted to pass through a document delivery port Pt.

Figure 3:
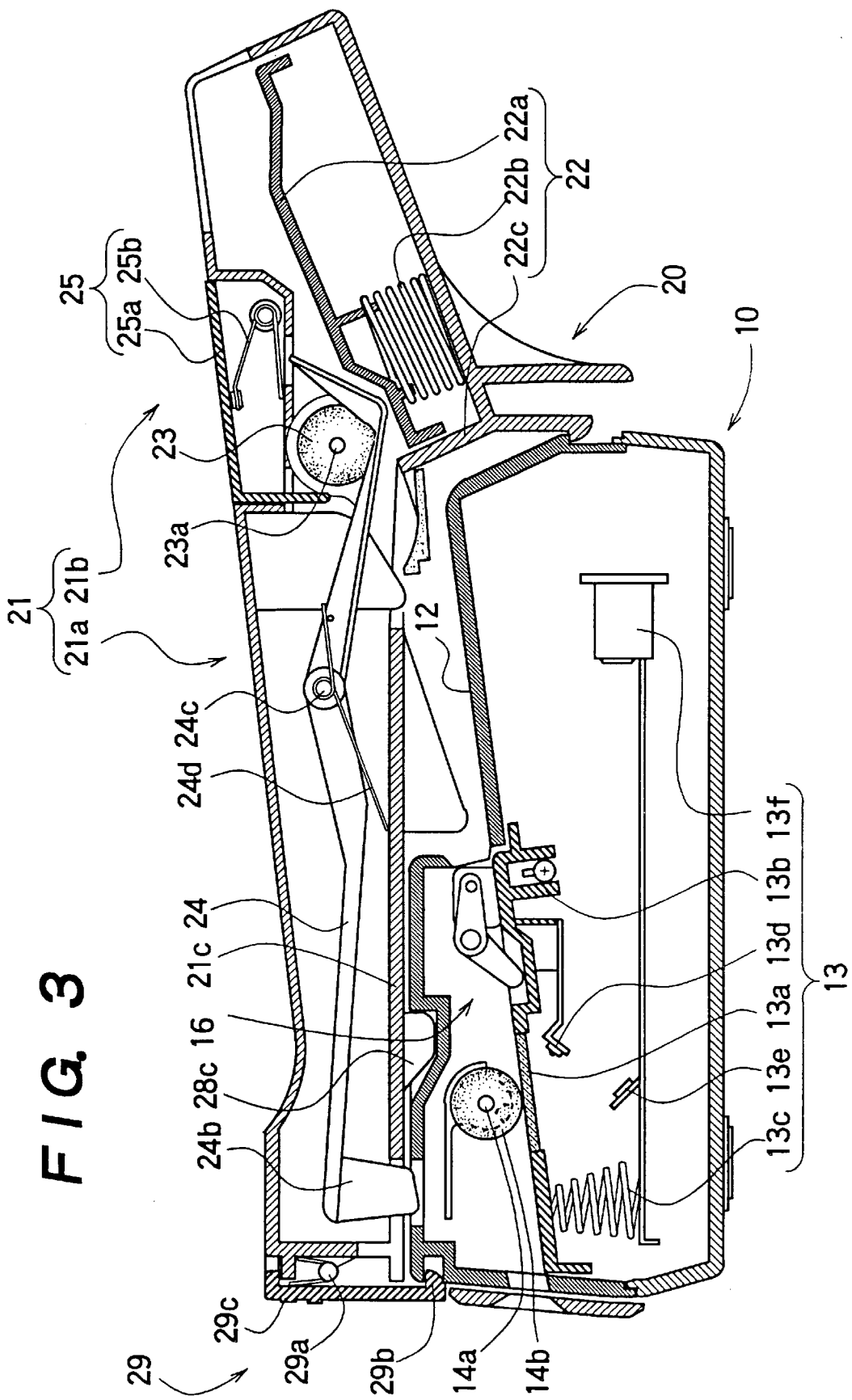
FIG. 3 is a side sectional view taken along the line III—III in FIG. 2.
Figure 4:
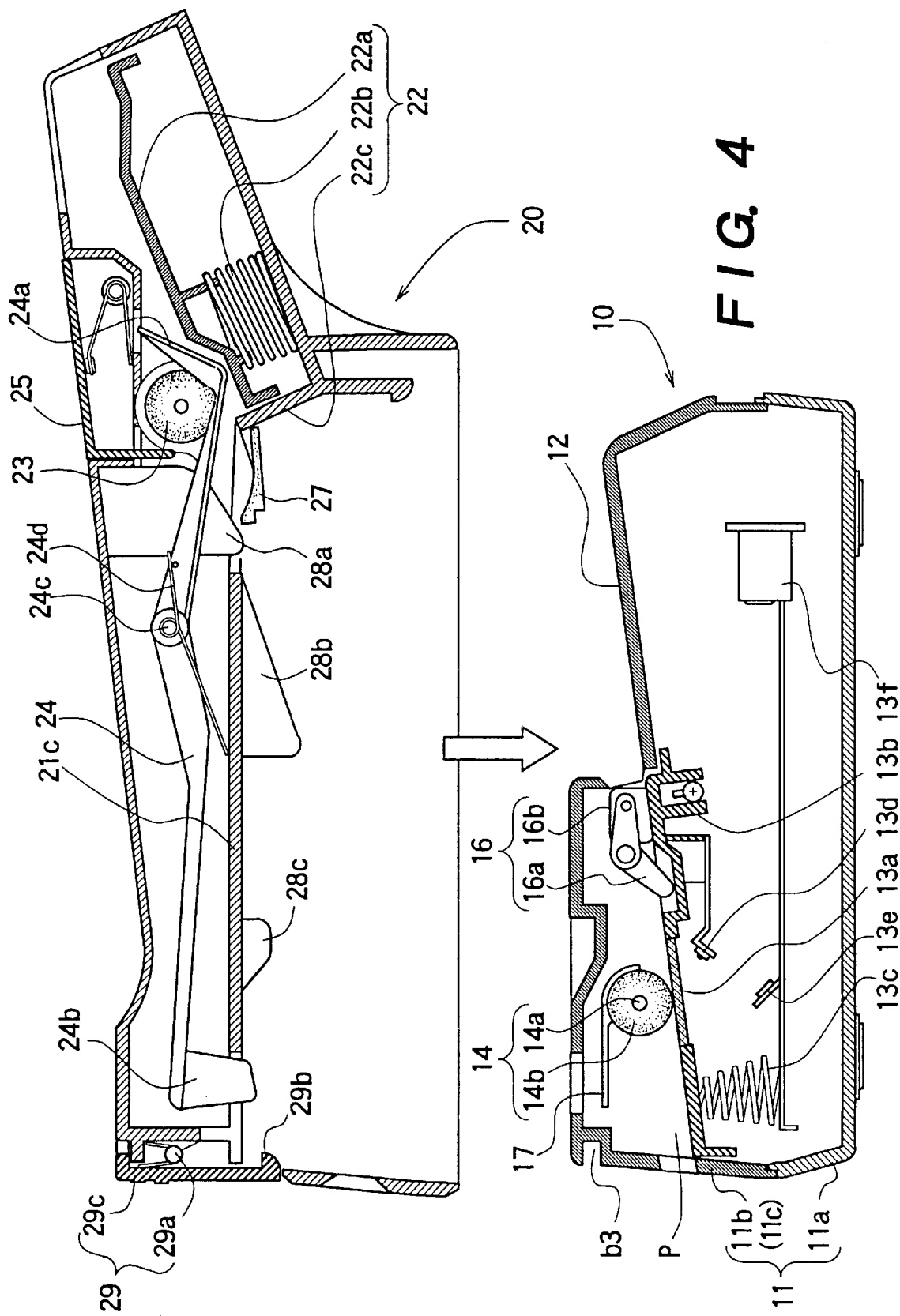
FIG. 4 is a side sectional view showing the state of separating the document feeding device from the document reading device in the system of FIG. 3.

As shown in FIG. 3, the document restraining member 24a falls into a dent portion d formed in the document bed 22a when no document is set on the document bed 22a, and the working member 24b confronts the through hole b1 formed in the upper panel of the driving part 11b of the document reading device 10 when uniting the document feeding device 20 to the document reading device 10. Thus, when setting the documents onto the document stacker 22, the restraining member 24a rises to its upper retreat position, and simultaneously, the working member 24b comes down to rotate the active member 17 of the document reading device, consequently to vary the intensity of the light reaching the photoelectric conversion means 13f. As a result, the setting of the documents on the document stacker 22 can be recognized.

Reference numeral 28a denotes a document guide member hanging from the ceiling of the lid frame on the document feeding device. The document sent out from the document stacker 22 through the document delivery port Pt passes under the document guide member 28a and is forwarded to the document passage P in the document reading device 10.

The handling means 25 is formed of a substantially L-shaped push member 25a disposed on the lid frame 21, and a spring 25b for urging the push member 25a upward so that the upper surface of the push member 25a becomes flush with the upper surface of the casing.

Figure 7A:
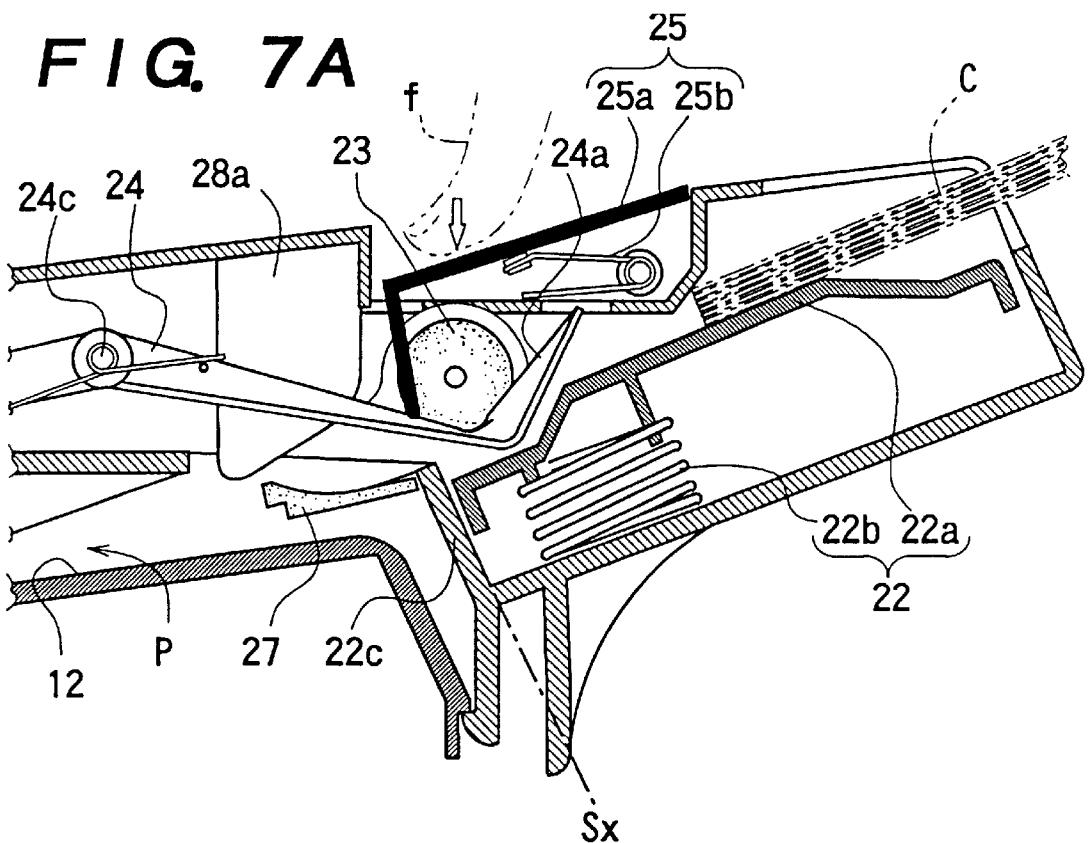
FIG. 7A through FIG. 7F are explanatory diagrams schematically illustrating the process of transporting a document in the image reading system of the invention.

As shown in FIG. 7A, by depressing the push member 25a with a finger, the document restraining member 24a is lowered through the medium of the actuating lever 24. By forcibly setting a sheaf of documents on the document bed 22a in this state, the document bed 22a is moved downward to permit the sheaf of documents to be thrust into between the document bed 22a and the restraining member 24a. The sheaf of documents thus set on the document bed is restrained from advancing by the document holding member 22c to retain the leading end of the sheaf of documents at the document delivery standard point Sx defined by the document holding member 22c and prevent the documents on the document stacker from getting over the document holding member 22c.

Figure 2:
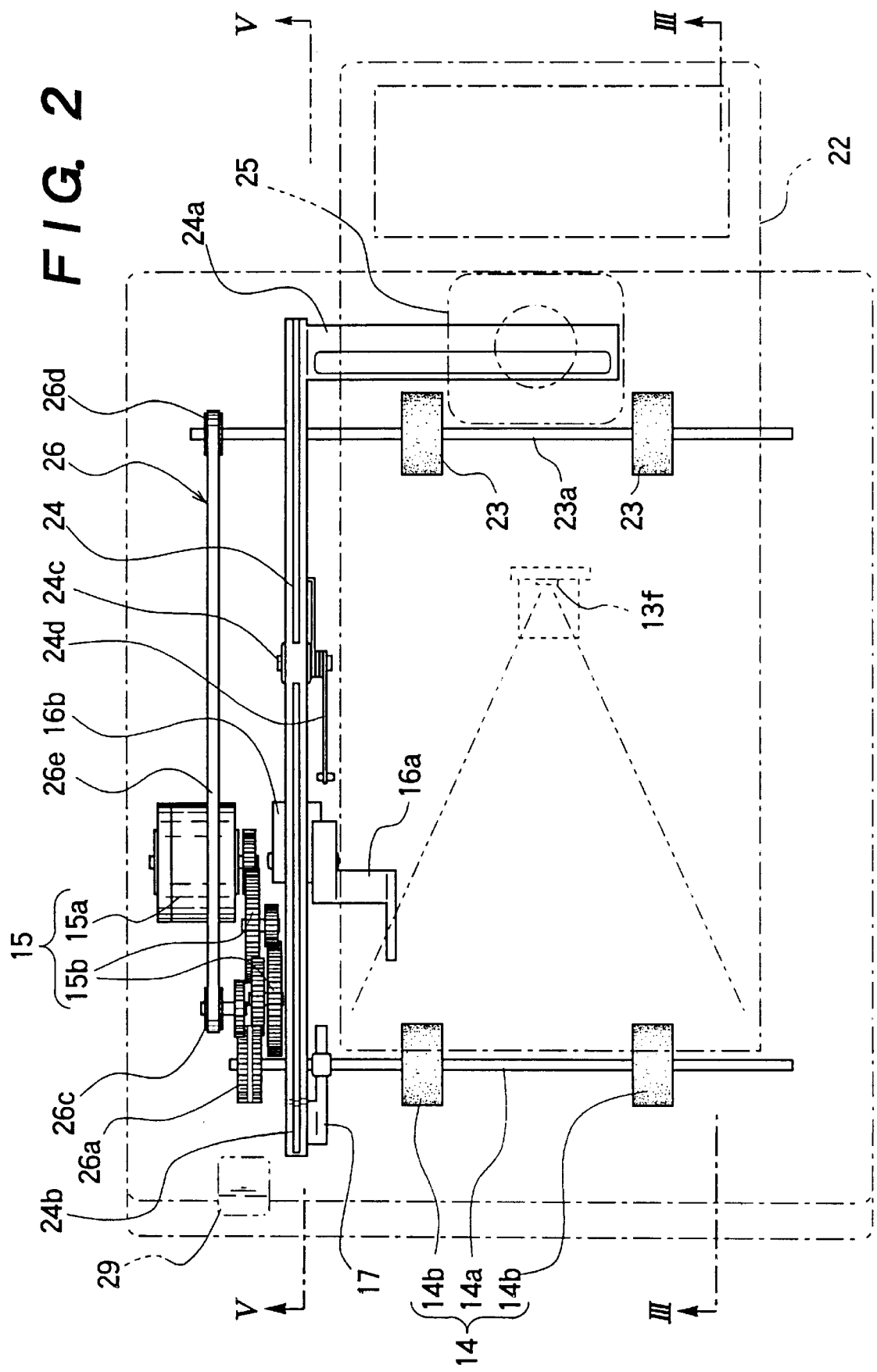
FIG. 2 is a schematic plan view of the image reading system of FIG. 1.
Figure 5:
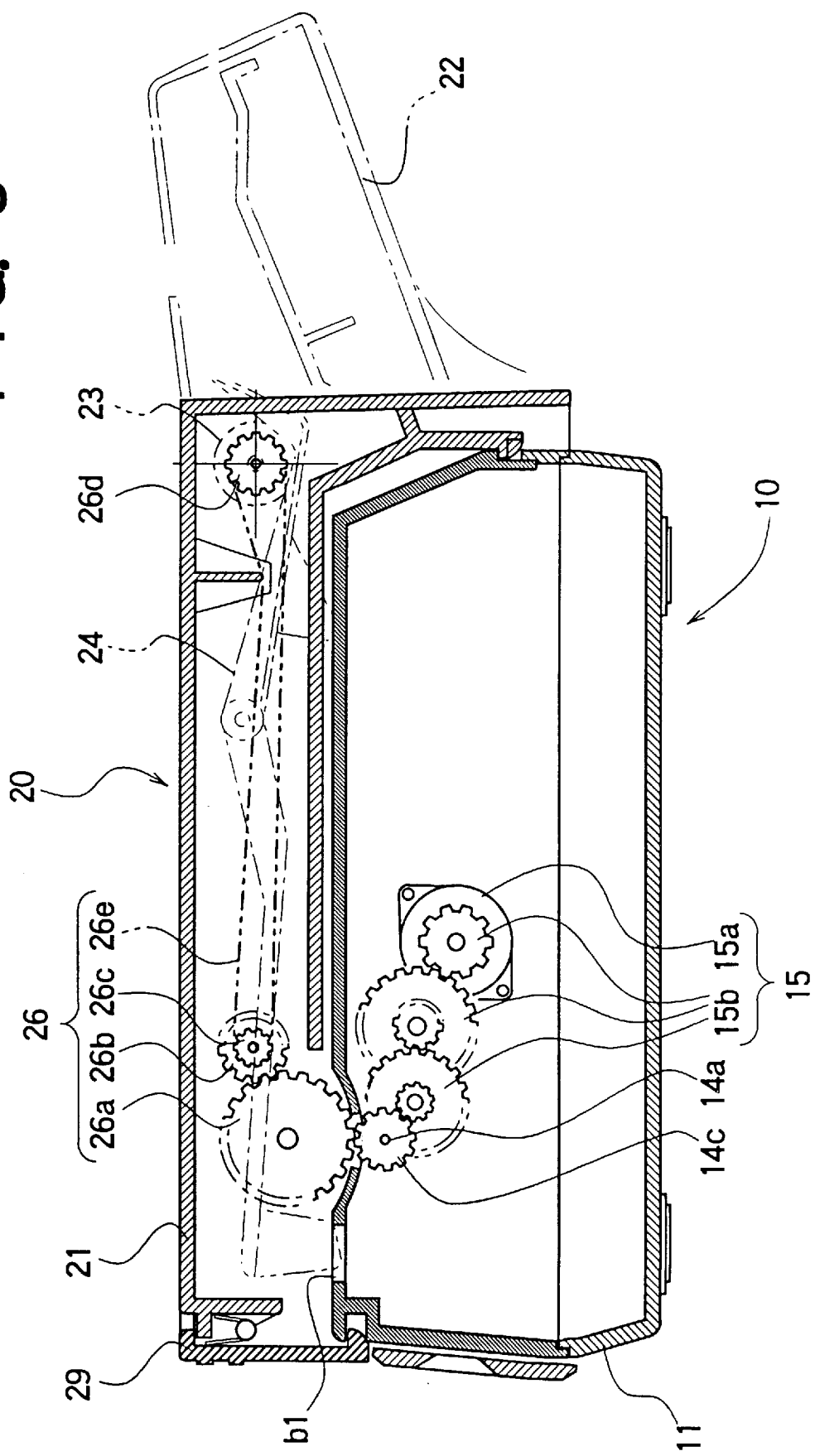
FIG. 5 is a side sectional view taken along the line V—V in FIG. 2.

The kick roller 23 is rotated by use of the motive power generated by the driving mechanism 15 for driving the document conveying means 14. That is, as shown in FIG. 2 and FIG. 5 by way of example, the motive power to be given to the kick roller is transmitted via a transmission means 26 including a gear 26a engaged with a gear 14c mounted on the rotation shaft 14a of the document conveying means 14, an intermediate gear 26b, a sprocket 26c, a sprocket 26d mounted on a rotation shaft 23a of the kick roller 23, and a timing belt 26e for connecting the sprockets 26c and 26d. However, the component elements of the transmission means 26 as noted above are not specifically limited in the invention, and any other elements may of course be used for constituting the transmission means.

When placing the document feeding device 20 on the document reading device 10, the gear 26a is engaged with the gear 14c of the document reading device 10 to transmit the motive power from the document reading device to the document feeding device via the aforementioned transmission means 26.

Denoted by 27 is a separation means for permitting only one document to pass therethrough. The separation means 27 is made of material having large frictional coefficient such as rubber or flexible resin, and disposed opposite to the document guide member 28a on the document passage P between the document stacker 22 and the document reading device 10. As illustrated in FIG. 7E, when the document C passes through between the document guide member 28a and the separation means 27, the separation means 27 is slightly bent downward. However, even if two or more documents intend to pass therethrough, the lower document or documents other than the uppermost document being in direct contact with the kick roller are prevented from advancing through the agency of the friction of the separation means 27. Thus, the so-called "double feed" of the documents can be prevented.

Denoted by 28b is a guide member defining a part of the document passage P formed between the partition member 21c and the document setting face 12 of the document reading device 10.

By 28c is denoted a positioning piece extending downward from the lower surface of the partition member 21c. The positioning piece 28c is fitted into a positioning hole b2 formed in the upper surface of the driving part 11b of the document reading device 10, when the document feeding device 20 is united is with the document reading device 10.

By 29 is denoted a lock member for ensuring the union of the document reading device 10 and document feeding device 20. The lock member 29 is rotatably supported on the device 20 through a fixing pin 29a, and provided with a hook claw 29b and a spring 29c for resiliently urging the hook claw 29b inwardly. Thus, when putting the document feeding device 20 on the document reading device 10 as indicated by the vertical arrows in FIG. 1, the hook claw 29b is caught by a hook hole b3 bored in the casing of the document reading device 10, so that the document feeding device 20 can be steadily united with the document reading device 10. By pushing the upper end of the lock member 29 inward, the hook claw 29b can be released from the hook hole b3, thus to allow the document feeding device 20 to be separated from the document reading device 10.

The operation of the automatic document feeding device in the image reading system described above will be described hereinafter with reference to FIG. 7A through FIG. 7F. The system in the illustrated embodiment assumes the state of uniting the document feeding device 20 with the document reading device 10 for automatically feeding given documents to be subjected to automatic image reading.

First, one or more documents C to be subjected to image processing are put on the document bed 22a of the document stacker 22 and thrust toward the document holding member 22c while depressing the push member 25a with a finger f as shown in FIG. 7A.

Figure 7B:
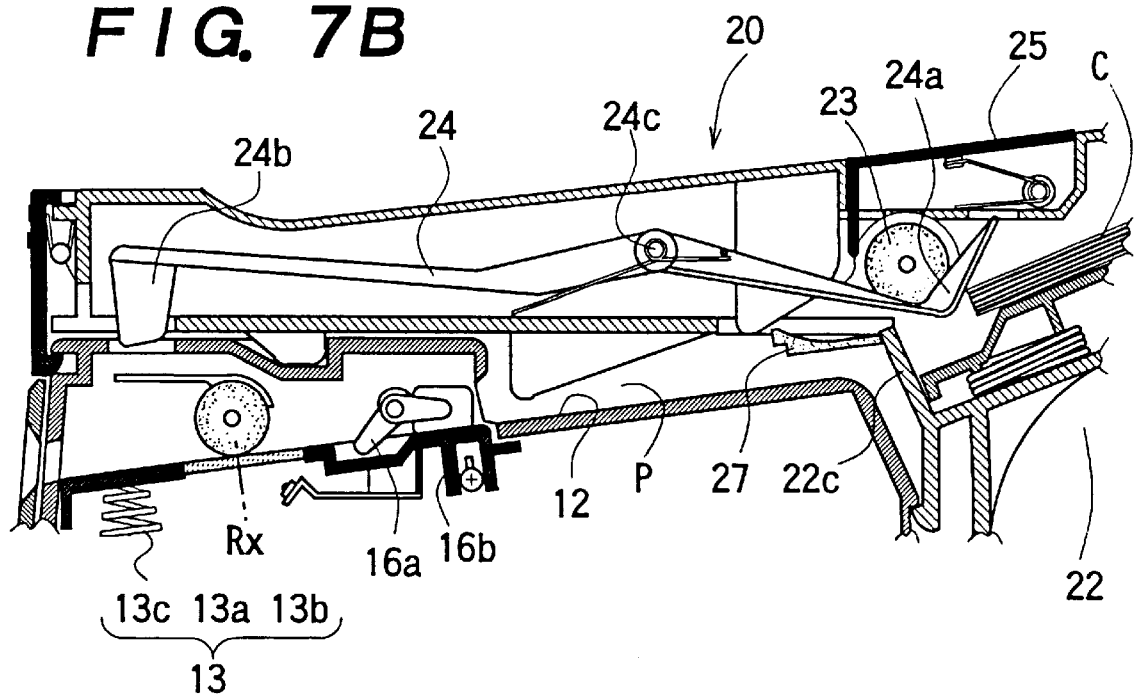
Figure 7C:
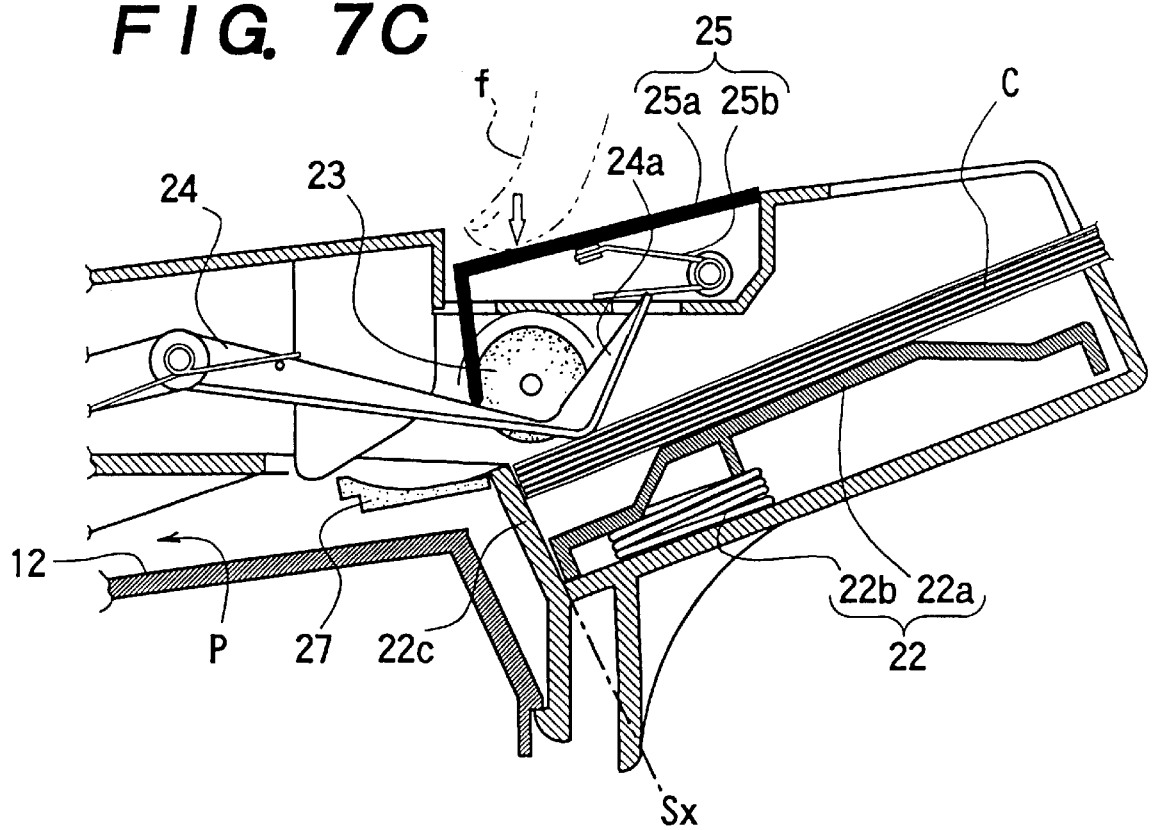

At this time, the leading end of the sheaf of documents comes in touch with the document restraining member 24a of the actuating lever 24, but the document bed 22a is moved downward against the spring 22b by thrusting the documents toward the document restraining member because the document restraining member 24a is pressed down to the lower check position by the push member 25a depressed with the finger f, as shown in FIG. 7B. As a result, the documents C thus thrust are blocked by the document holding member 22c as shown in FIG. 7C. The documents C are appropriately set on the document stacker without getting over the document holding member 22c.

Figure 7D:
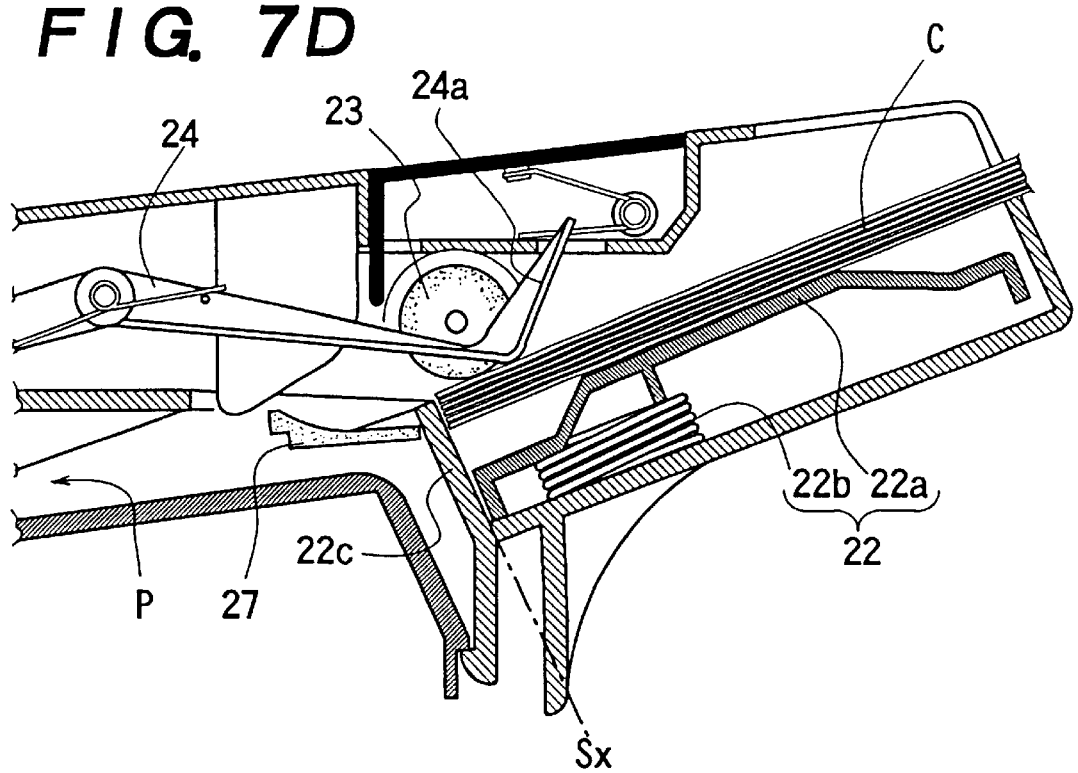
Figure 7E:
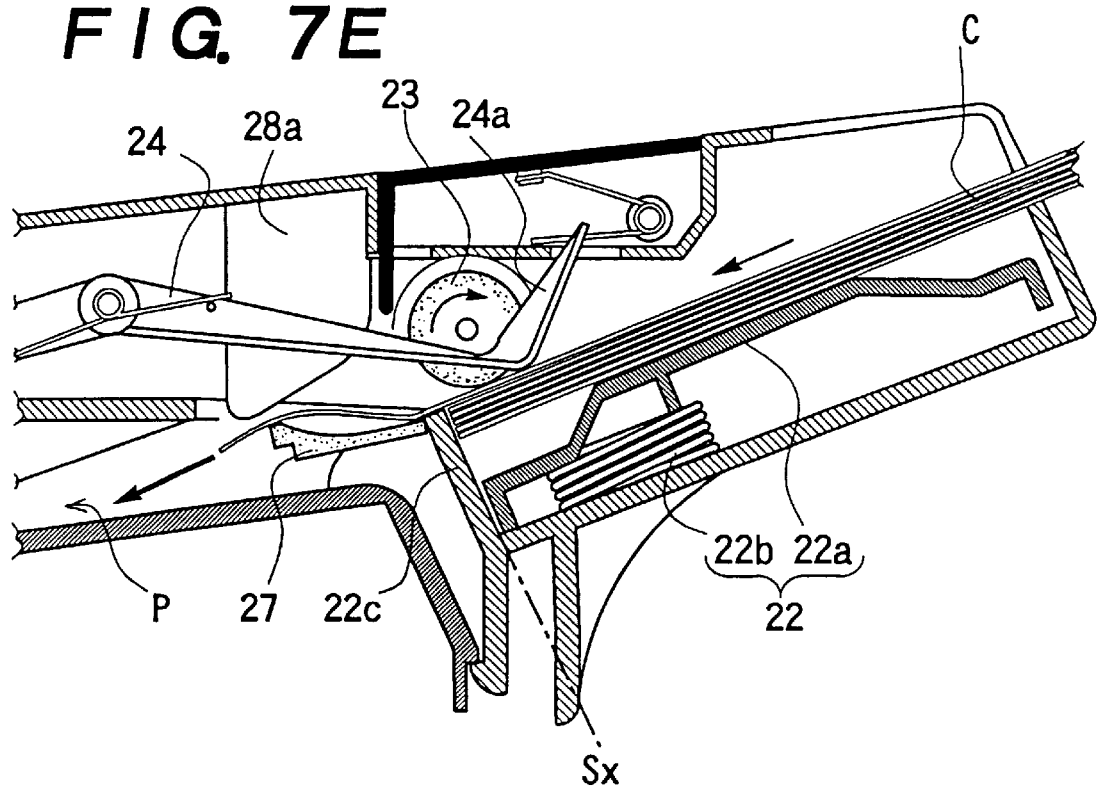

Then, the finger f is released from the push member 25a to allow the documents C to come in touch with the kick roller 23 as shown in FIG. 7D.

Meanwhile, the actuating lever 24 rotates around the shaft 24c with the documents C being set on the document stacker, thus pressing down the active member 17. The movement of the active member is detected by the photoelectric conversion means 13f, so that the documents C set on the document stacker can be recognized.

Next, a power switch (not shown) mounted on the document reading device 10 is switched on to have the power source 15a driving the conveying roller 14b and the kick roller 23, as the result of which one document C is sent out from the stacker 22 and forwarded into the document passage P through the separation means 27 as shown in FIG. 7E.

Figure 7F:
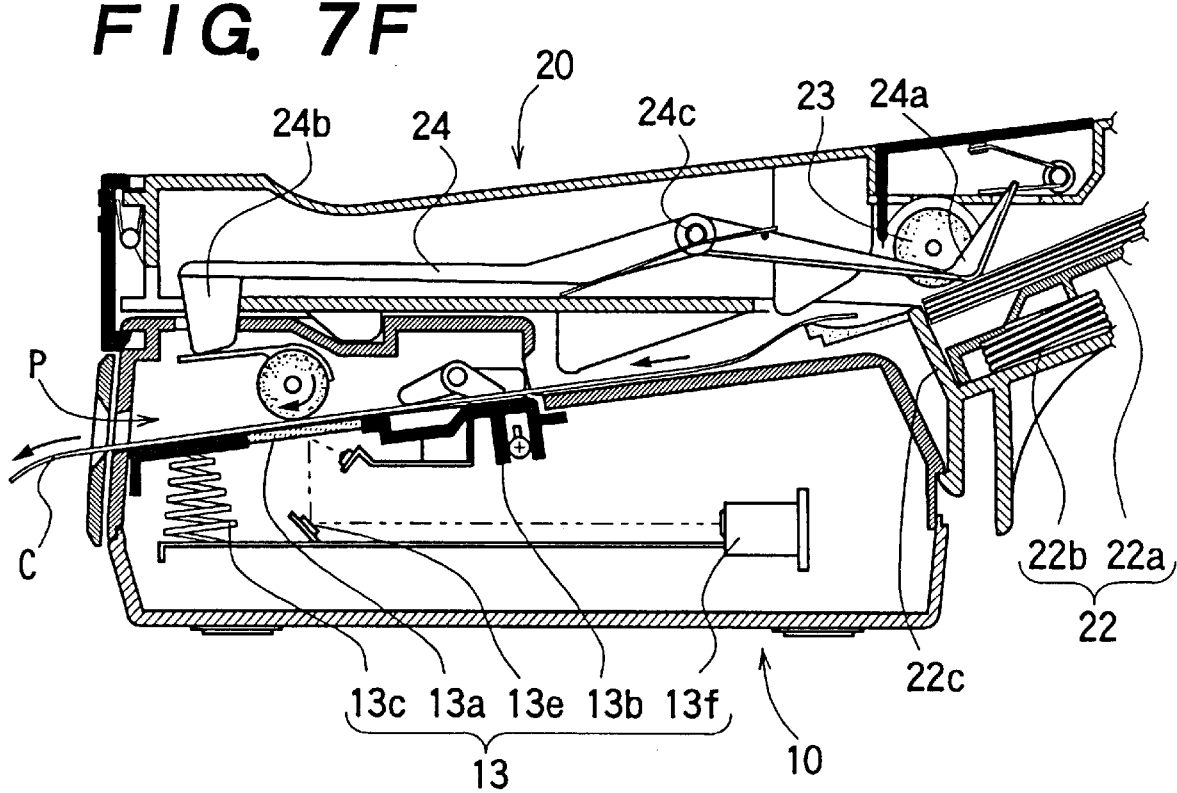

The document C entering the document passage P is continuously sent by the conveying roller 14b as shown in FIG. 7F. On route to the image reading position, the document C being forwarded acts on the detection lever 16a, so that the leading end of the document C is detected by use of the sensor 16b to bring the image reading means in its image reading standby state. Since arriving of the leading end of the document at the image reading position Rx causes change of the intensity of light reflected from the document toward the photoelectric conversion means, it can be recognized optically that the document to be read arrives at the prescribed position, thus to start image reading by the image reading means 13.

As is explained above, the image reading system according to this invention can easily be composed by placing the document feeding device for automatically feeding the documents to be read on the stand-alone type document reading device. Besides, the document feeding device according to the invention can rationally be driven by use of the driving system for the document reading device. The documents set on the document feeding device can be set accurately at the appropriate delivery position by the kick roller, document restraining member and handling means, so that the documents set on the stacker can be successfully sent out one by one from the stacker to the document reading position with exquisite timing, consequently to improve accuracy of image reading and character recognition.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An image reading system comprising:

image reading means for reading an image on a given document located at a document reading position;

means for conveying the document through said document reading position; and a document feeding device, said document feeding device including;

a document stacker for stacking one or more documents to be read;

a kick roller for sending out the document from said document stacker;

a separation means for permitting only one document sent out from said document stacker by said kick roller to pass therethrough; and a document restraining member for restraining said one or more documents stacked on said stacker, said document restraining member and said stacker being movable relative to each other between a lower check positions at which the document stacked in said document stacker is prevented from entering said separation means, and an upper retreat position.

2. An image reading system comprising:

image reading means for reading an image on a given document passing through a document reading position;

means for conveying the document through said document reading position; and a document feeding device, said document feeding device including:

a document stacker for stacking one or more documents to be read;

a kick roller for sending out the document from said document stacker;

a separation means for permitting only one document sent out from said stacker by said kick roller to pass therethrough; and a document restraining member movable between a lower check position, at which the document stacked in said document stacker is prevented from entering said separation means, and an upper retreat position;

wherein said document restraining member includes:

an actuating lever movable with the document being set on said document stacker; and handling means for moving said document restraining member between said lower check position, at which the document stacked in said document stacker is prevented from entering said separation means, and said upper retreat position.

3. An image reading system comprising:

image reading means for reading an image on a given document passing through a document reading position;

means for conveying the document through said document reading position; and a document feeding device, said document feeding device including:

a document stacker for stacking one or more documents to be read;

a kick roller for sending out the document from said document stacker;

a separation means for pennitting only one document sent out from said stacker by said kick roller to pass therethrough; and a document restraining member movable between a lower check position, at which the document stacked in said document stacker is prevented from entering said separation means, and an upper retreat position;

wherein said document restraining member includes:

an actuating lever movable with the document being set on said document stacker;

handling means for moving said document restraining member between said lower check position, at which the document stacked in said document stacker is prevented from entering said separation means, and said upper retreat position; and document detecting means for detecting the documents set on said document stacker by using said actuating lever.

4. An image reading system comprising an image reading device including image reading means for reading an image on a given document passing through a document reading position, means for conveying the document through said document reading position, and a driving mechanism for said document conveying means; and a document feeding device capable of being detachably attached to said image reading device, said document feeding device including a document stacker for stacking one or more documents to be read, a kick roller for sending out the document from said document stacker, a separation means for permitting only one document sent out from said document stacker by said kick roller to pass therethrough, and a document restraining member movable between a lower check position at which the document stacked in said document stacker is prevented from entering said separation means and an upper retreat position.

5. An image reading system as claimed in claim 4, wherein said document restraining member includes an actuating lever movable with the document being set on said document stacker, and handling means for moving said document restraining member between said lower check position at which the document stacked in said document stacker is prevented from entering said separation means and said upper retreat position.

6. An image reading system as claimed in claim 4, wherein said document restraining member includes an actuating lever movable with the document being set on said document stacker, handling means for moving said document restraining member between said lower check position at which the document stacked in said document stacker is prevented from entering said separation means and said upper retreat position, and document detecting means for detecting the documents set on said document stacker by using said actuating lever.

7. An image reading system as claimed in claim 4, further comprising a transmission means for connecting said driving mechanism to said kick roller to transmit motive power generated by said driving mechanism to said kick roller in said document feeding device when uniting said document feeding device with said document reading device, thereby to drive said kick roller.

8. An image reading system comprising:

an image reading device including a casing having a base frame with a document setting face, a driving part, and an upper frame opposed to the base frame astride a document passage; image reading means disposed adjacent to said document setting face and serving for reading an image on a given document passing through a document reading position; document conveying means including one or more conveying rollers for conveying the document through a document reading position; a driving mechanism for said document conveying means; and document detecting means for detecting the documents set on said document setting face; and a document feeding device capable of being detachably attached to said image reading device, said document feeding device including a document stacker for stacking one or more documents to be read, a kick roller for sending out the document from said document stacker, a separation means for permitting one document sent out from said document stacker by said kick roller to pass, and a document restraining member movable between a lower check position at which the document stacked in said document stacker is prevented from entering said separation means and an upper retreat position.

* * * * *